(12) United States Patent
Hanatani

(10) Patent No.: US 6,718,844 B2
(45) Date of Patent: Apr. 13, 2004

(54) TWIST-GRIP SHIFT CONTROL DEVICE FOR A BICYCLE

(75) Inventor: Masahiro Hanatani, Spanish Village (SG)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/077,063

(22) Filed: Feb. 13, 2002

(65) Prior Publication Data

US 2003/0150290 A1 Aug. 14, 2003

(51) Int. Cl.[7] .............................. F16C 1/10; G05G 1/08; B62K 25/02
(52) U.S. Cl. .......................... 74/502.2; 74/489; 74/475; 74/505; 74/506; 74/473.14
(58) Field of Search ............................. 74/500.5–502.6, 74/489, 488, 471 R, 505, 506, 141.5, 142, 473.14

(56) References Cited

U.S. PATENT DOCUMENTS

| | | | | |
|---|---|---|---|---|
| 5,588,331 | A | | 12/1996 | Huang et al. .................. 74/489 |
| 5,799,542 | A | * | 9/1998 | Yamane ........................ 74/489 |
| 5,823,058 | A | * | 10/1998 | Arbeiter ....................... 74/489 |
| 5,921,139 | A | | 7/1999 | Yamane .................... 74/473.13 |
| 6,276,227 | B1 | * | 8/2001 | Ose ............................. 74/489 |
| 6,276,231 | B1 | * | 8/2001 | Yamane ..................... 74/551.9 |
| 2002/0134189 | A1 | * | 9/2002 | Ose ........................... 74/502.2 |

FOREIGN PATENT DOCUMENTS

| | | | | |
|---|---|---|---|---|
| EP | 0671318 A2 | * | 9/1995 | .................. 74/489 |
| EP | 768234 A1 | | 4/1997 | |
| EP | 893336 A2 | | 1/1999 | |

* cited by examiner

Primary Examiner—Vinh T. Luong
(74) Attorney, Agent, or Firm—James A. Deland

(57) ABSTRACT

A bicycle shift control device comprises a base member for attachment to the bicycle, a operating member rotatably supported relative to the base member for rotating in first and second directions, a transmission control member rotatably mounted relative to the base member for controlling the pulling and releasing of a transmission control element, a bracket for supporting a transmission control element diverting surface, and an intermediate member coupled for rotation with the transmission control member. The intermediate member rotates around a first axis, and the intermediate member can move in the direction of the first axis between an engagement position, in which the intermediate member engages the bracket, and a disengagement position, in which the intermediate member is disengaged from the bracket. The intermediate member includes a first cam surface for causing movement of the intermediate member in the direction of the first axis toward the disengagement position during rotation of the intermediate member, and the intermediate member includes a positioning surface for preventing the intermediate member from rotating around the first axis when the intermediate member is in the engagement position.

24 Claims, 11 Drawing Sheets ial embodiment of a twist-grip shift control device
TWIST-GRIP SHIFT CONTROL DEVICE FOR A BICYCLE

BACKGROUND OF THE INVENTION

The present invention is directed to control devices for bicycles and, more particularly, to a twist-grip shift control device for shifting a bicycle transmission.

An example of a twist-grip shift control device is shown in U.S. Pat. No. 5,921,139. That shift control device comprises a fixed member that is nonrotatably fixed to the bicycle handlebar, a handgrip operating member rotatably supported relative to the fixed member for rotating in first and second directions, a takeup member rotatably mounted relative to the fixed member for controlling the pulling and releasing of a transmission control element, and an intermediate member coupled for rotation with the takeup member. Ratchet teeth are formed on the fixed member and the intermediate member for holding the intermediate member, and hence the takeup member, in a plurality of fixed positions. Additional ratchet teeth are formed on the intermediate member and the handgrip operating member for rotating the intermediate member and the takeup member for pulling and releasing the transmission control element. A pulley is mounted to a bracket that extends from the base member for changing the direction of the transmission control element after the transmission control element exits the takeup member so that the transmission control element can extend in the direction of the bicycle handlebar.

It was learned that the tension on the transmission control element affects the operation of the shift control device. More specifically, the amount of the transmission control element pulled or released between the fixed positions of the takeup member would vary depending upon the tension applied to the transmission control element, thus causing the transmission attached to the transmission control element to be placed in a position that was not optimum for the selected gear. Such positioning errors could cause the transmission to generate undesirable noise or to malfunction.

SUMMARY OF THE INVENTION

The present invention is directed to a twist-grip shift control device that operates reliably even when the transmission control element experiences high tension. In one embodiment of the present invention, a bicycle shift control device comprises a base member for attachment to the bicycle, a operating member rotatably supported relative to the base member for rotating in first and second directions, a transmission control member rotatably mounted relative to the base member for controlling the pulling and releasing of a transmission control element, a bracket for supporting a transmission control element diverting surface, and an intermediate member coupled for rotation with the transmission control member. The intermediate member rotates around a first axis, and the intermediate member can move in the direction of the first axis between an engagement position, in which the intermediate member engages the bracket, and a disengagement position, in which the intermediate member is disengaged from the bracket. More specifically, the intermediate member includes a first cam surface for causing movement of the intermediate member in the direction of the first axis toward the disengagement position during rotation of the intermediate member, and the intermediate member includes a positioning surface for preventing the intermediate member from rotating around the first axis when the intermediate member is in the engagement position. Having the intermediate member engage the bracket in the engagement position minimizes or eliminates variations in performance caused by tension exerted on the transmission control element.

BRIEF DESCRIPTION OF THE DRAWINGS

FIGS. 7A and 7B are cross sectional views depicting the shapes of the gear portions of the intermediate member, the bracket, and the operating member, wherein FIG. 7A is taken along line 7A—7A in FIG. 2 and FIG. 7B is taken along line 7B—7B in FIG. 2;

DETAILED DESCRIPTION OF THE EMBODIMENTS

Figure 1:
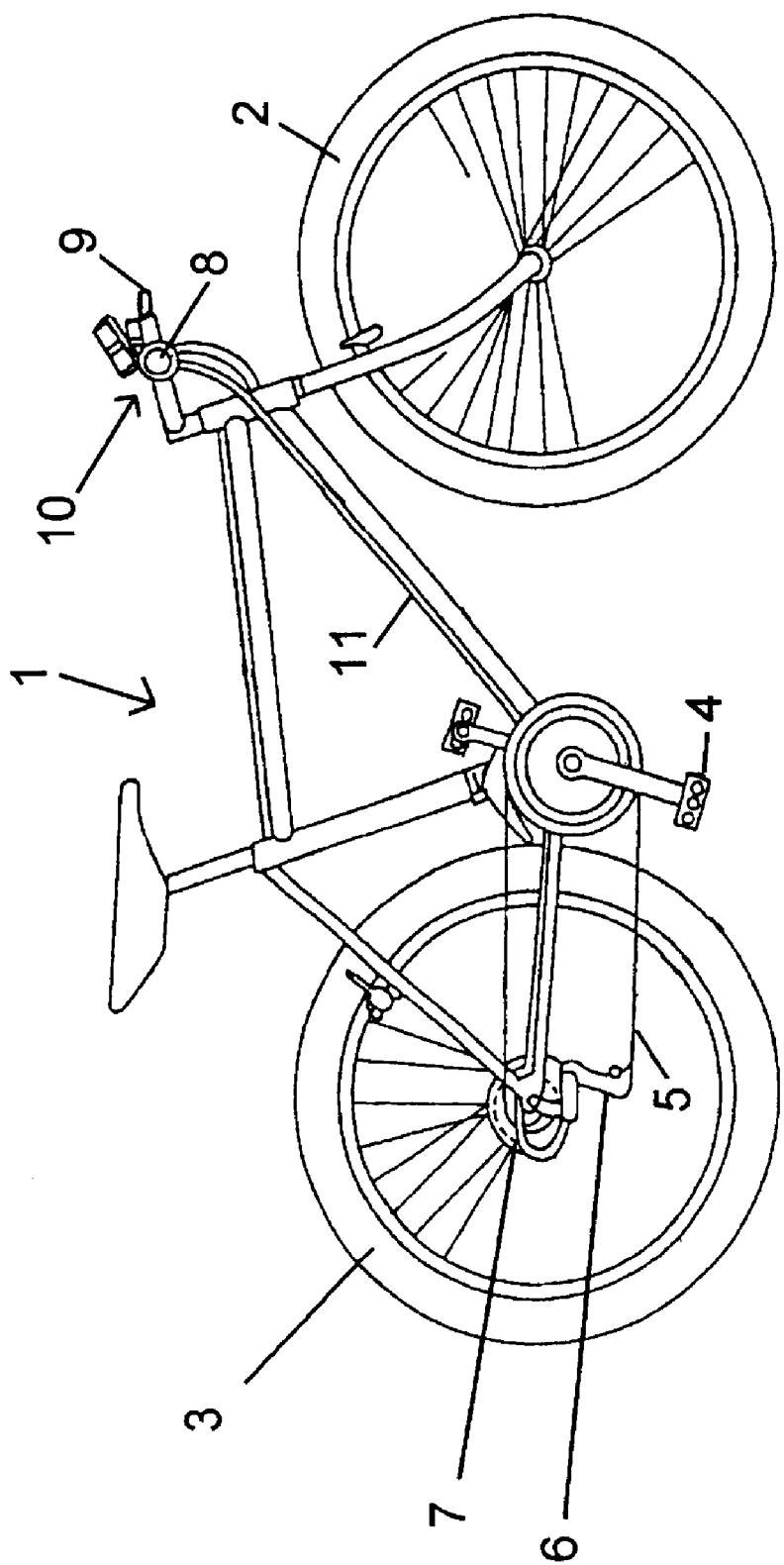
FIG. 1 is a side view of a bicycle which incorporates a particular embodiment of a twist-grip shift control device according to the present invention.

FIG. 1 shows a mountain bicycle 1 provided with the shift control device according to the present invention. This bicycle is equipped with a front wheel 2, pedals 4, a derailleur 6 for moving a chain 5 over a sprocket cassette 7 attached to a rear wheel 3, a brake mechanism 9, and the like. A twist-grip shift control device 10 that is attached to a handlebar 8 operates the derailleur 6 via a shifting cable 11. As used herein, the terms "front direction," "back direction," "transverse direction," and the like refer to the directions with respect to the bicycle. For example, "right" means to the right of the rider sitting on the saddle.

Figure 2:
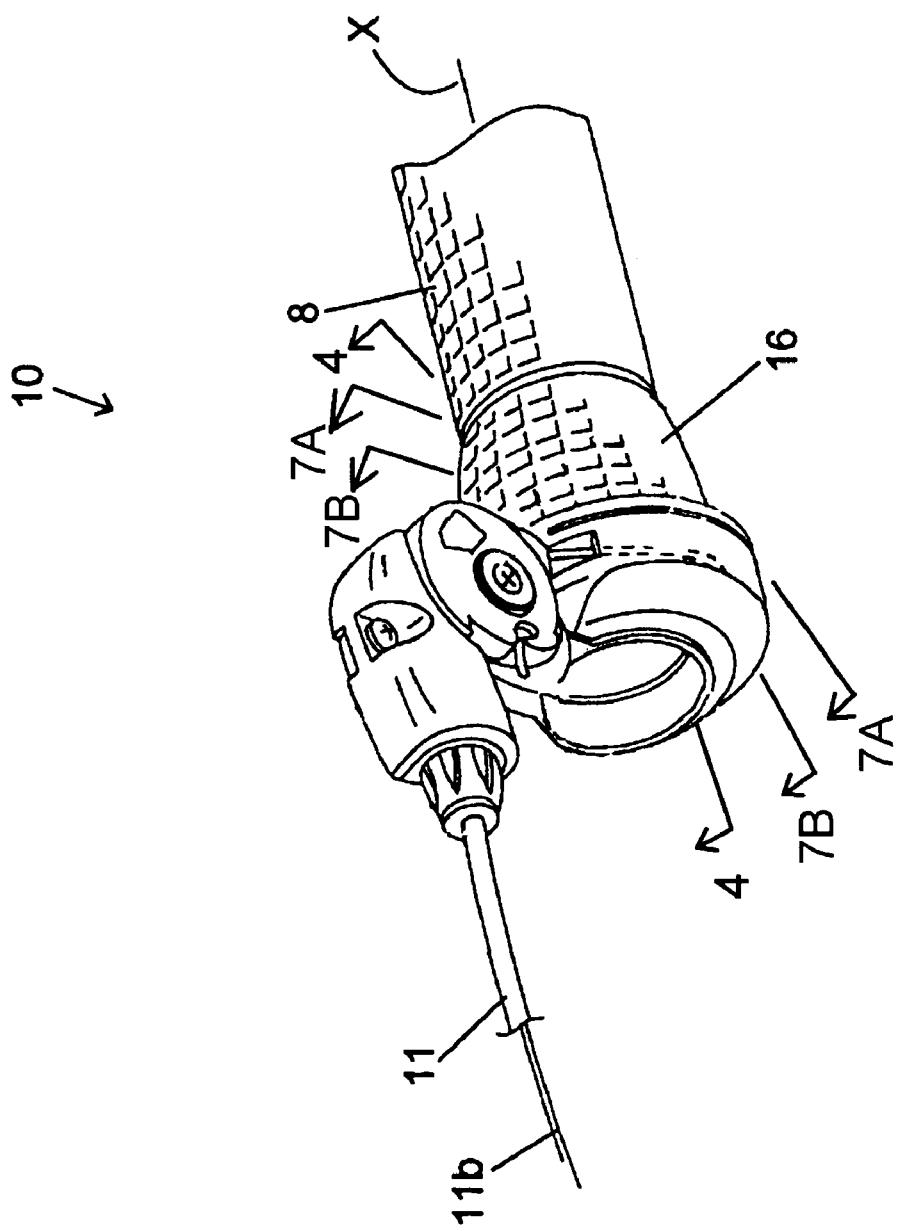
FIG. 2 is an oblique view of a particular embodiment of a twist-grip shift control device according to the present invention.
Figure 3:
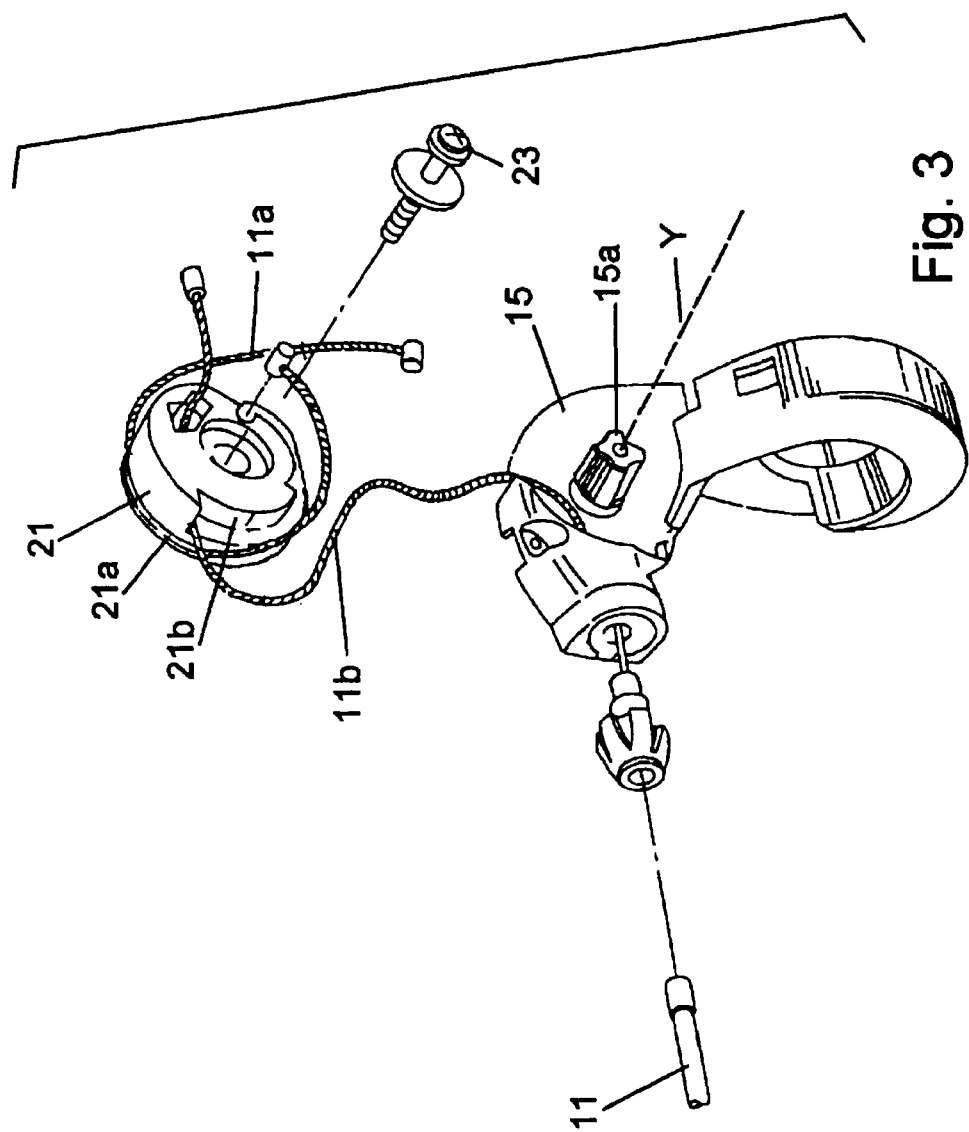
FIG. 3 is a partially exploded view of the twist-grip shift control device shown in FIG. 2.
Figure 4:
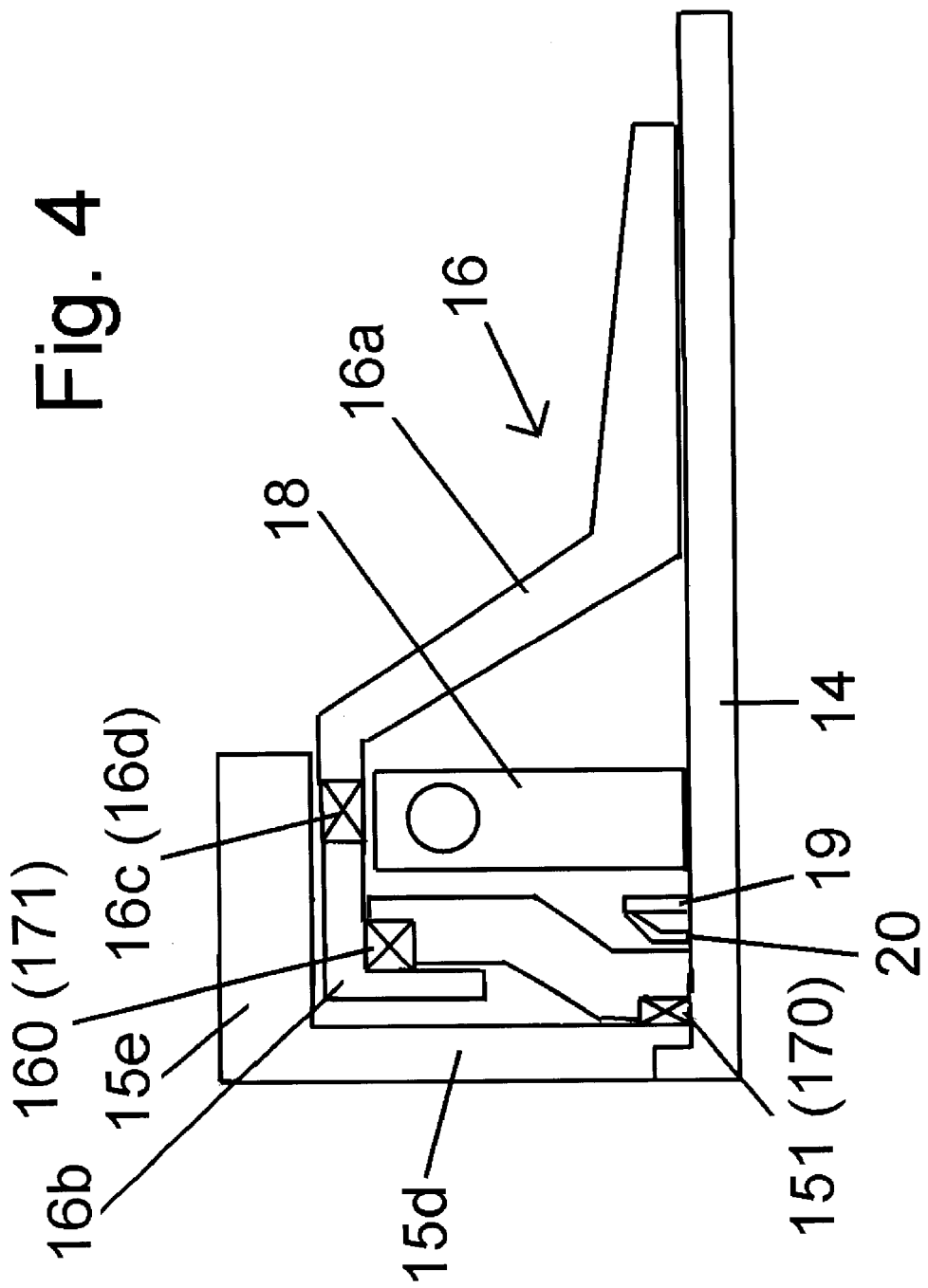
FIG. 4 is a partial cross sectional view of the twist-grip shift control device taken along line 4—4 in FIG. 2.

FIG. 2 is an oblique view of a particular embodiment of a twist-grip shift control device 10 according to the present invention, FIG. 3 is a partially exploded view of shift control device 10, and FIG. 4 is a partial cross-sectional view of shift control device 10. In general, rotating an operating member 16 around a first axis X that runs along the handlebar 8 rotates a transmission control member in the form of a wire takeup member 18 which, in turn, pulls and releases an intermediate wire 11a that is connected to a deflection pulley 21 rotatably mounted to a bracket 15. An inner wire 11b of control cable 11 is connected to deflection pulley 21 and to derailleur 6 so that rotation of operating member 16 ultimately pulls and releases inner wire 11b to operate derailleur 6. Intermediate wire 11a and inner wire 11b together function as a transmission control element. In this embodiment, seven-step shifting can be accomplished with shift control device 10, but the number of steps can be varied depending upon the application.

Figure 10:
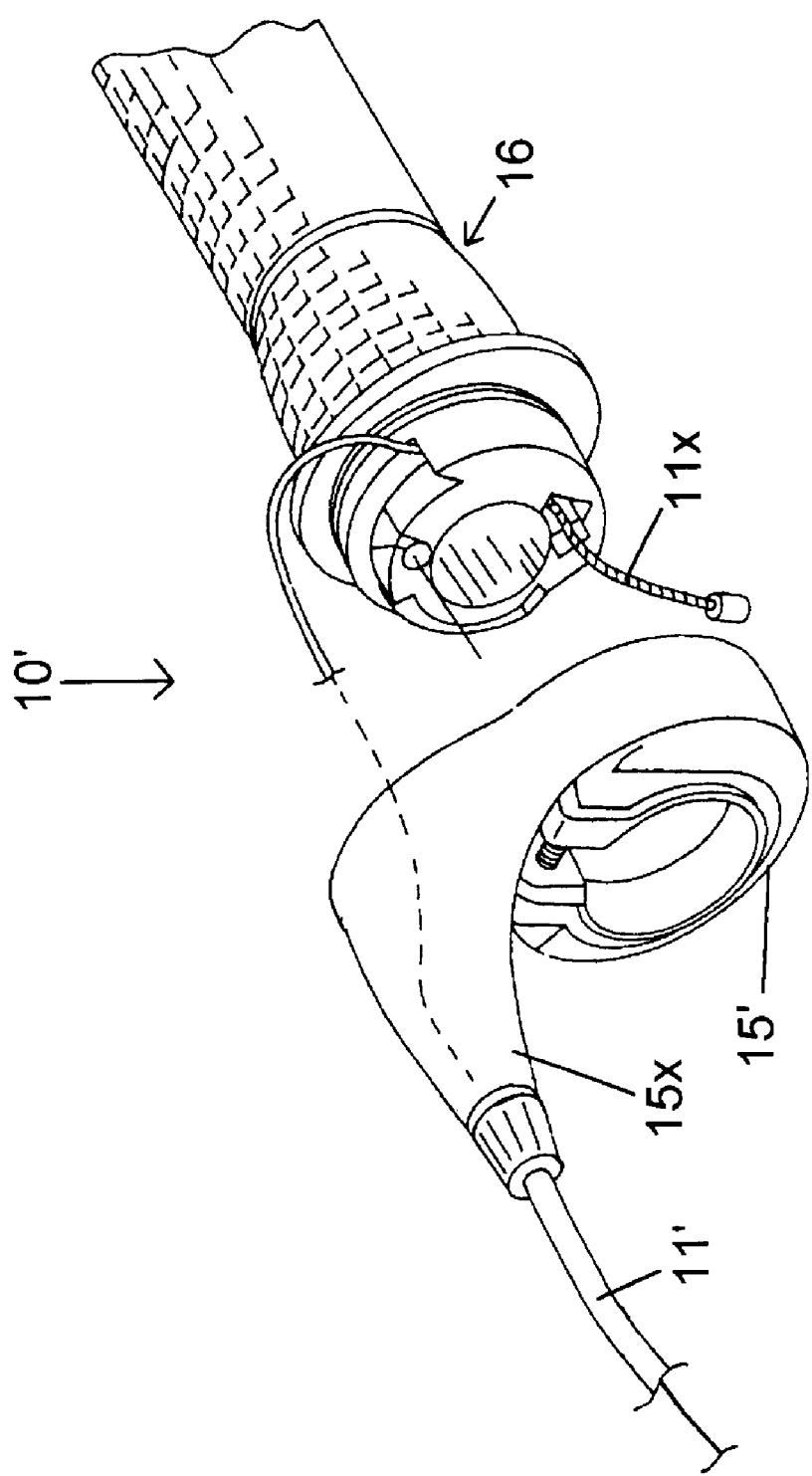
FIG. 10 is an oblique view of an alternative embodiment of a twist-grip shift control device according to the present invention.

In this embodiment, deflection pulley 21 is rotatably mounted to a pivot shaft 15a of bracket 15 by a screw 23 so that deflection pulley 21 can rotate around a second axis Y that is perpendicular to the first axis X. Deflection pulley 21 includes a transmission control element diverting surface 21a for receiving intermediate wire 11a and a transmission control element diverting surface 21b for receiving inner wire 11b. Transmission control element diverting surfaces 21a and 21b serve to change the direction of the transmission control element from the radially outwardly extending direction of intermediate wire 11a to the axial direction of inner wire 11b. Transmission control element diverting surfaces 21a and 21b also can be used to adjust the cable pull/release rate of the transmission control element. In other embodiments, a transmission control element in the form if a single wire could be directly attached to takeup element 18, and deflection pulley 21 could include a single transmission control element diverting surface for changing the direction of the single wire as it leaves takeup element 18. Alternatively, as shown in FIG. 10, a shift control device 10' could eliminate deflection pulley 21 entirely, and a bracket 15' could include a curved portion 15x for changing the direction of an inner wire 11x of a transmission control cable 11'.

The structure of shift control device 10 will now be described in detail. The inventor has discovered that the source of the problem of the variations in performance caused by tension exerted on the transmission control element arose from the placement of the positioning mechanism on the base member in the prior art. Shift control device 10 solves the problem by placing the positioning mechanism on bracket 15 as noted in more detail below. Although the description that follows refers to the shift control device 10 that is used to control the rear derailleur 6 and that is attached to the right side of the bicycle handlebar 8, the same shift control device can be provided on the left side of the handlebar.

Figure 5:
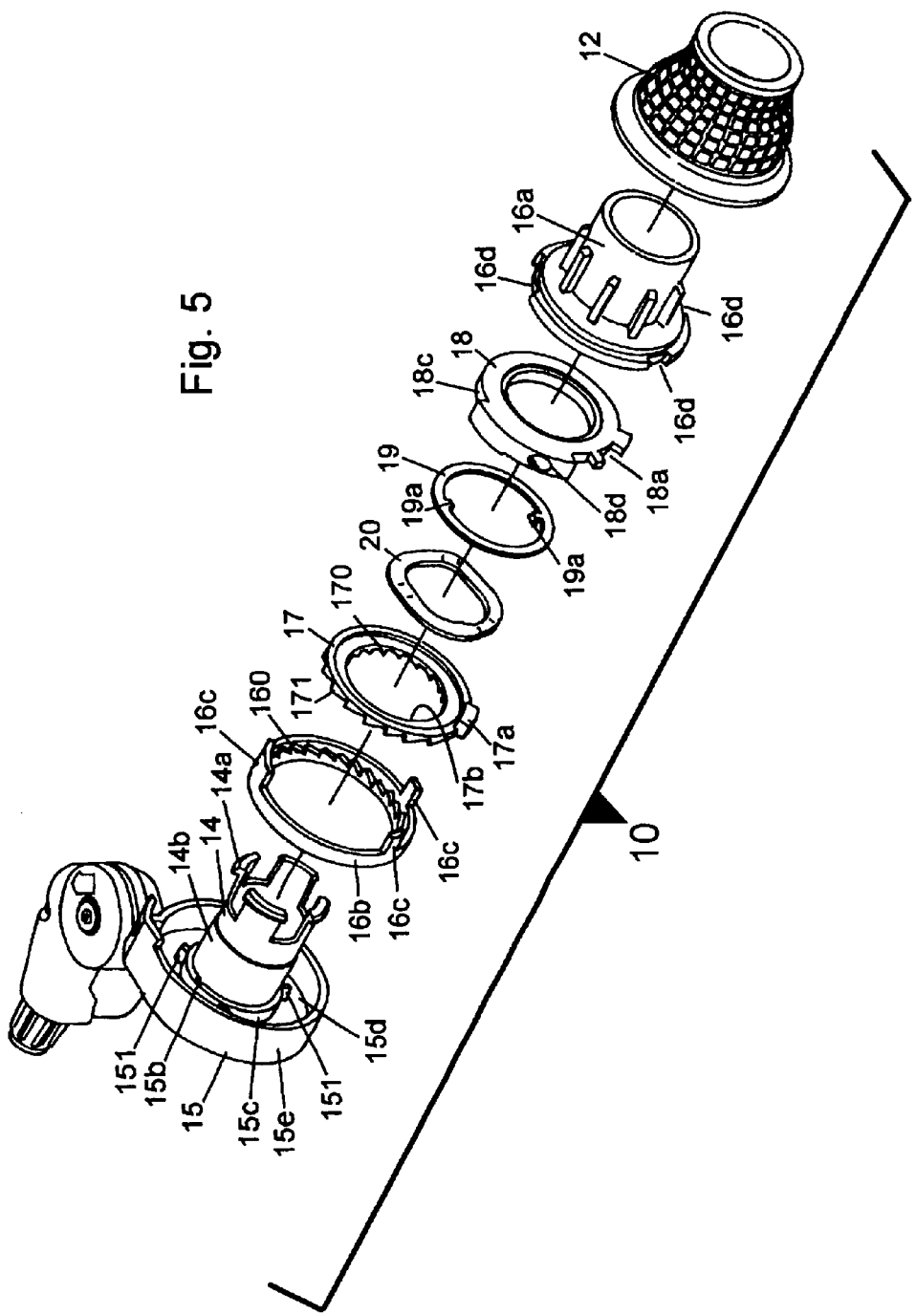
FIG. 5 is an exploded view of the twist-grip shift control device shown in FIG. 2.

As shown in FIGS. 4 and 5, shift control device 10 comprises a base member 14 attached to bracket 15 in such a way that it cannot rotate in relation to the handlebar, a handgrip actuating member 16a mounted on base member 14 for rotation around axis X and held in place by retaining tabs 14a on base member 14, a flexible cover 12 surrounding handgrip actuating member 16a to facilitate gripping, an auxiliary actuating member 16b having coupling tabs 16c that engage coupling grooves 16d in handgrip actuating member 16a so that handgrip actuating member 16a and auxiliary actuating member 16b rotate as a unit, an intermediate member 17 that meshes with both bracket 15 and auxiliary actuating member 16b in a manner described below, the takeup member 18 having a coupling groove 18a that slidingly and nonrotably engages a coupling tab 17a on intermediate member 17 so that takeup member 18 and intermediate member 17 rotate as a unit, a fixing washer 19 having coupling tabs 19a that engage corresponding coupling grooves 15b in bracket 15, and a spring washer 20 for biasing intermediate member 17 towards auxiliary actuating member 16b and bracket 15. Handgrip actuating member 16a and auxiliary actuating member 16b together form operating member 16. A wire winding surface 18c is formed on the outer peripheral surface of takeup element 18, and this wire winding surface 18c takes up the intermediate wire 11a. A coupler 18d connects the tip of the intermediate wire 11a with the takeup member 18.

Bracket 15 has an inner tubular portion 15c that contains coupling grooves 15b and that mounts to the outer peripheral surface of base member 14, a radially outwardly extending side wall 15d (perpendicular to base member 14) containing diametrically opposed positioning teeth 151 formed in a plane 15s (FIG. 7B), and an outer tubular portion 15e disposed radially outwardly from the outer peripheral surface of auxiliary actuating member 16b. The plane 15s that faces the intermediate element 17 and is perpendicular to the first axis X is referred to as "the reference plane 15s of the bracket." The positioning teeth 151 extend along the first axis X away from the reference plane 15s of the bracket 15, and the height of the positioning teeth 151 in relation to the reference plane 15s is indicated as 15h. Auxiliary actuating member 16b includes a plurality of drive teeth 160 provided in a reference plane 16s (FIG. 7A) facing the intermediate element 17. The plurality of drive teeth 160 extend along the first axis X away from the reference plane 16s of auxiliary actuating member 16b, and the height of the drive teeth 160 in relation to the reference plane 16s is indicated as 160h.

Figure 6:
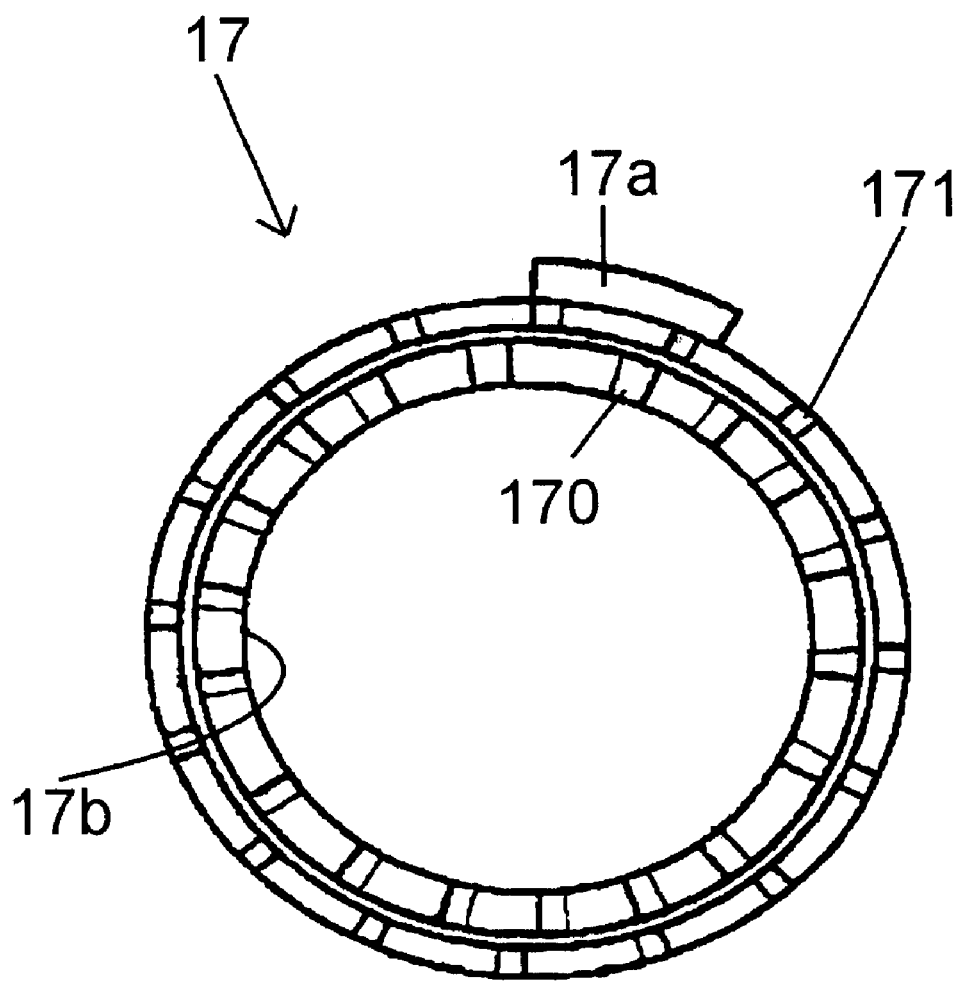
FIG. 6 is a rear view of the intermediate member shown in FIG. 5.

As shown in FIGS. 5 and 6, the intermediate member 17 has an annular shape, and the inner peripheral surface 17b thereof is rotatably and slidably fitted on the outer peripheral surface 14b of base member 14. Intermediate member 17 is spring-loaded in the direction of auxiliary actuating member 16b by spring 20 positioned between intermediate member 17 and fixing member 19 as shown in FIG. 4. The surface of intermediate member 17 that faces bracket 15 is equipped with a first gear portion comprising a plurality of gear teeth 170 that engage the positioning teeth 151 of bracket 15, and a second gear portion comprising a plurality of gear teeth 171 that engage the plurality of drive teeth 160 of the auxiliary actuating member 16b. The plurality of gear teeth 170 are located radially inwardly of the plurality of gear teeth 171.

The plurality of gear teeth 170 and 171 extend along the first axis X in the direction of auxiliary actuating member 16b and away from a reference plane 17s (FIGS. 7A–7B) facing the auxiliary actuating member 16. The height 171h of the plurality of gear teeth 171 of intermediate member 17 that engage the plurality of drive teeth 160 of auxiliary actuating member 16 is greater than the height 170h of the plurality of gear teeth 170 of intermediate member 17 that engage the positioning teeth 151 of bracket 15.

Figure 7A:
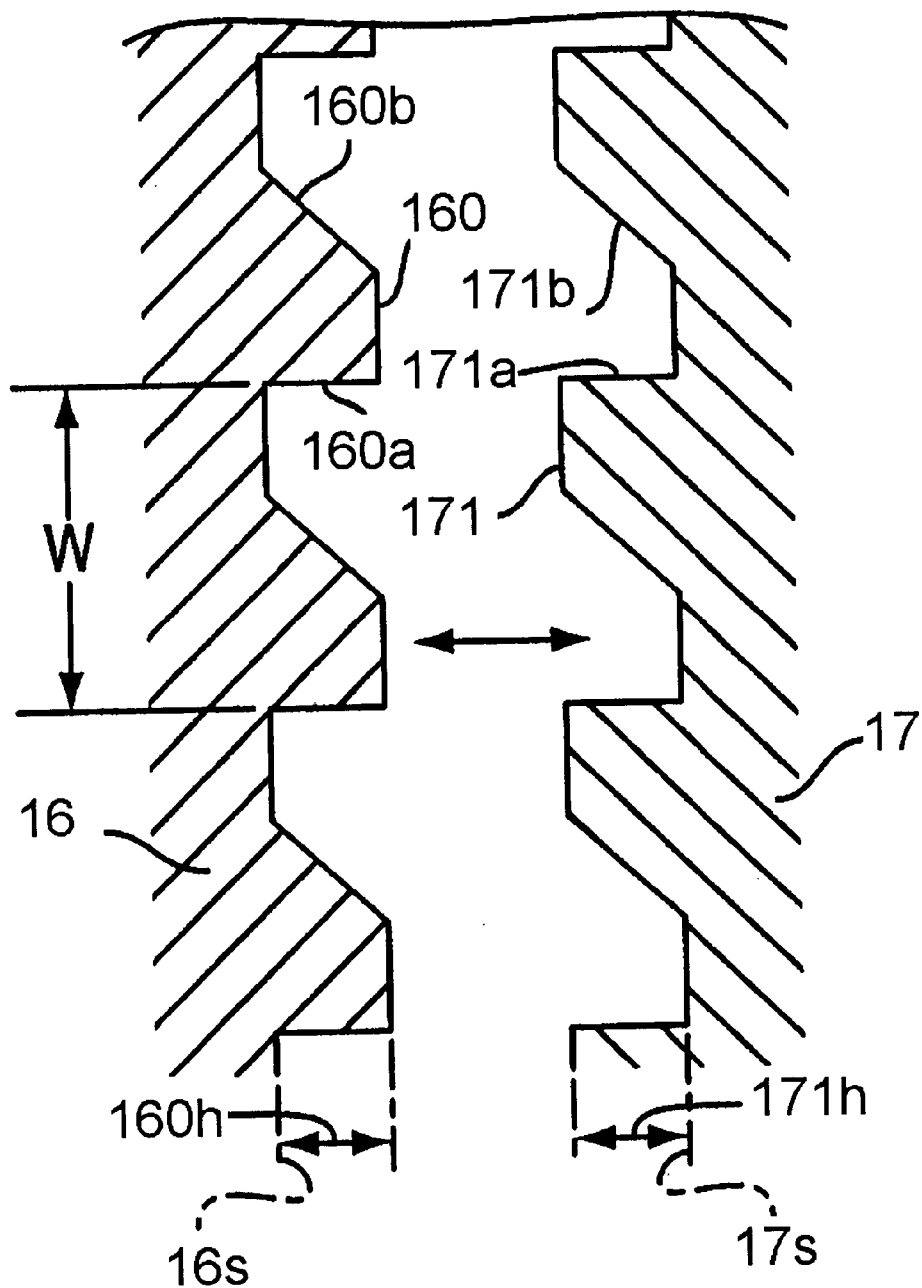
Figure 7B:
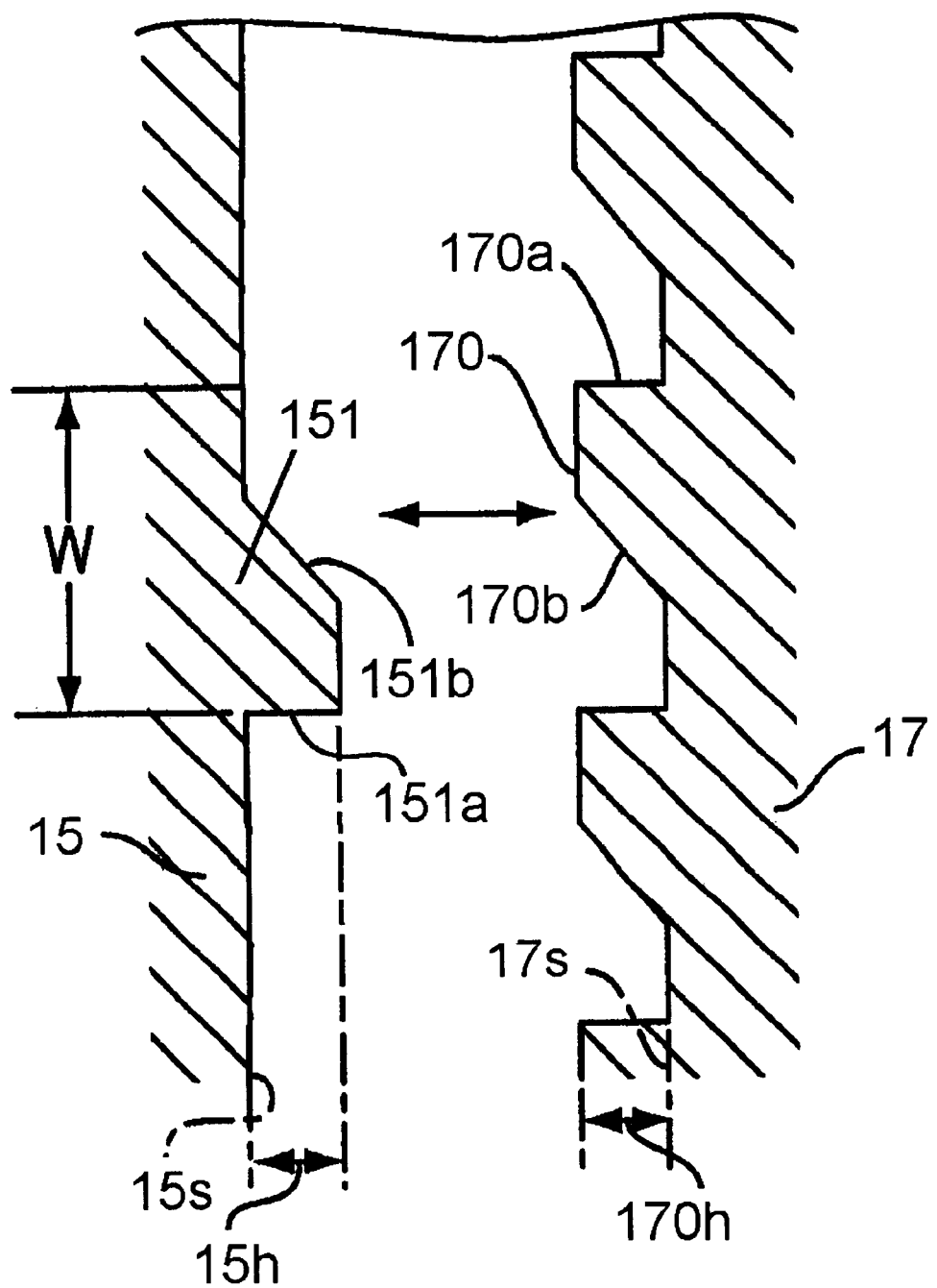

FIG. 7A schematically shows a cross section of the plurality of gear teeth 171 of intermediate member 17 that face the plurality of drive teeth 160 of auxiliary actuating member 16b, and FIG. 7B schematically shows a cross section of the plurality of gear teeth 170 of intermediate member 17 that faces the positioning teeth 151 of bracket 15. The plurality of gear teeth 171 of intermediate member 17 are provided with surfaces 171a that extend in the direction of the first axis X, and with cam surfaces 171b that are inclined relative to the first axis X. The plurality of drive teeth 160 of the auxiliary actuating member 16 that face the plurality of gear teeth 171 of intermediate member 17 are provided with drive surfaces 160a extending in the direction of the first axis X for rotatably driving the intermediate member 17 and with cam surfaces 160b corresponding to the second cam surfaces 171b for axially driving the intermediate member 17. The rotational widths W of the gear teeth of the intermediate member and the auxiliary actuating member 16b are set to a length equal to the displacement necessary for shifting the speed step by one step. The plurality of gear teeth 170 of intermediate member 17 are provided with positioning surfaces 170a that extend in the direction of the first axis X, and these surfaces come into contact with surfaces 151a of positioning teeth 151 of bracket 15. The plurality of gear teeth 170 are also provided with first cam surfaces 170b that are inclined relative to the first axis X, and these surfaces come into contact with cam surfaces 151b of positioning teeth 151 in a manner described below.

The operation of shift control device 10 will now be described with reference to FIGS. 8A–8D and 9A–9D. For the sake of simplicity, the shape of the gear teeth will be shown in simplified form.

Figure 8A:
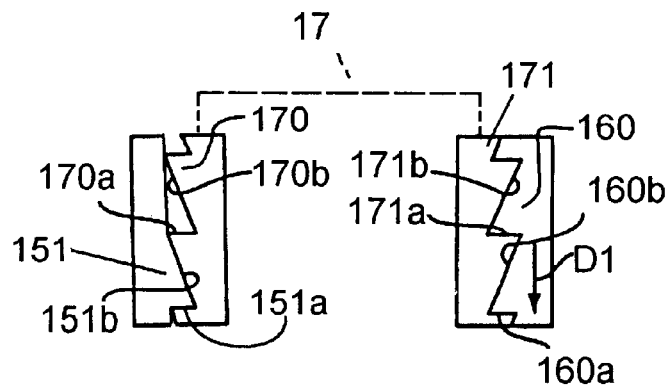
FIGS. 8A–8D are schematic views showing the operation of the twist-grip shift control device when the operating member is rotated in a first direction, the views being a combination of views taken along lines 7A—7A and 7B—7B in FIG. 2.
Figure 8B:
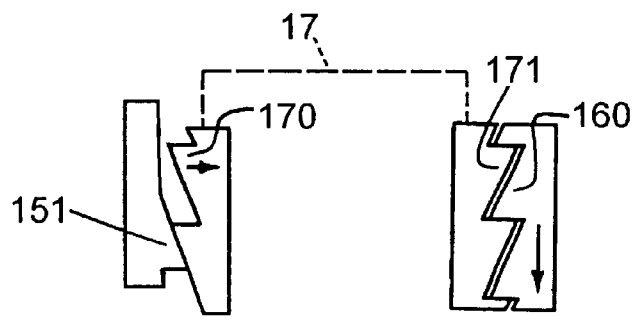
Figure 8C:
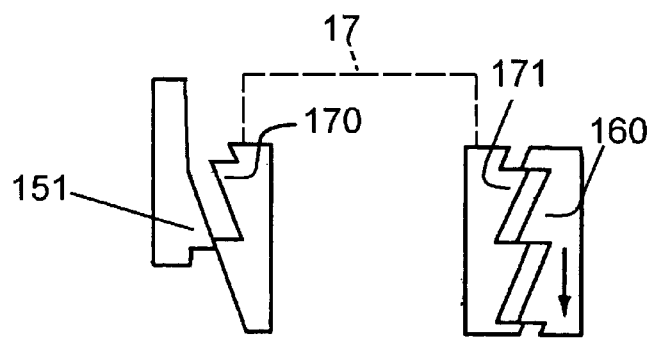
Figure 8D:
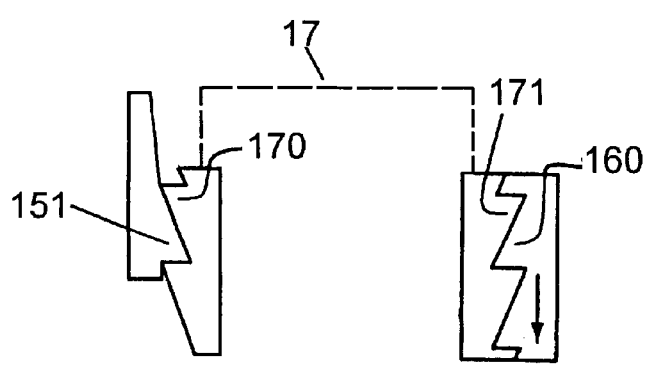
Figure 9A:
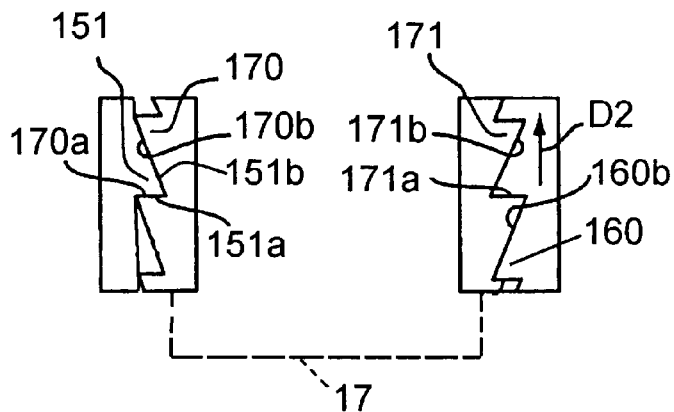
FIGS. 9A–9D are schematic views showing the operation of the twist-grip shift control device when the operating member is rotated in a second direction, the views being a combination of views taken along lines 7A—7A and 7B—7B in FIG. 2.
Figure 9B:
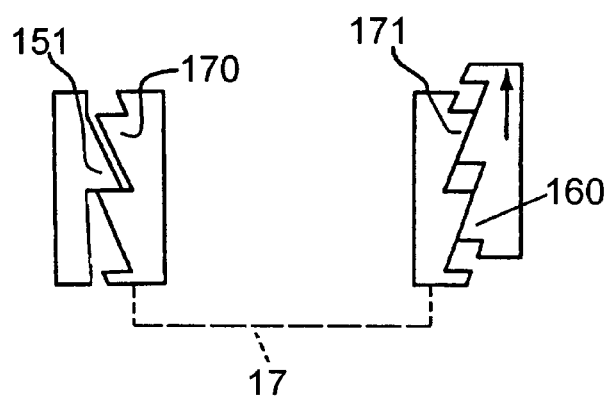
Figure 9C:
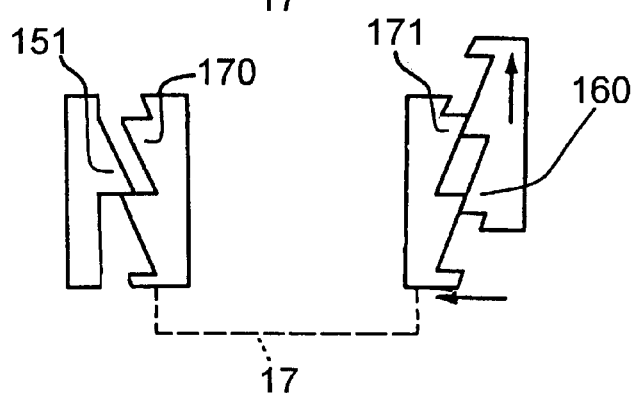
Figure 9D:
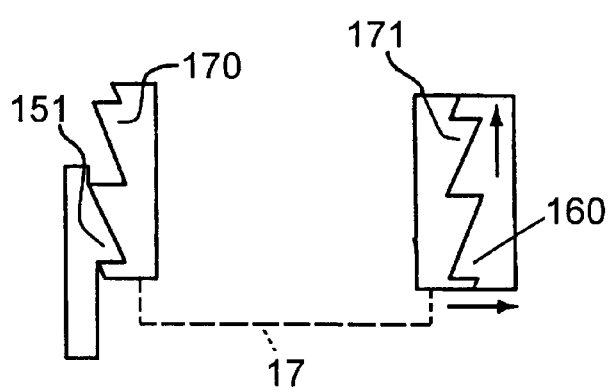

The manner in which the components move when operating member 16 is rotated in the takeup direction D1 is shown sequentially from FIGS. 8A–8D. First, the drive surfaces 160a of the plurality of drive teeth 160 of the auxiliary actuating member 16b press against the surfaces 171a of the plurality of gear teeth 171 of the intermediate member 17 and rotate intermediate member 17, and hence takeup member 18, around the first axis X. At the same time, the first cam surfaces 170b displace the intermediate member 17 in the direction of the first axis X as shown in FIGS. 8A and 8B. Further rotation of the operating member 16 in the takeup direction D1 causes the gear teeth 170 of intermediate member 17 to jump over the positioning teeth 151 of the bracket 15 as shown in FIGS. 8C and 8D. Thereafter, the intermediate member 17 is again fixed by the bracket 15 in a position resulting from the shifting of the intermediate element 17 by a single speed step (W). Because the intermediate member 17 is in constant engagement with the takeup member 18, the takeup member 18 moves a single speed step together with the intermediate element 17. At the end of the operation, the positioning surfaces 170a of the intermediate element 17 are pressed against the corresponding surfaces 151a of the bracket 15, and the intermediate element 17 is held in place with respect to the bracket 15.

Because the height 171h of the gear teeth 171 is greater than the height 170h of the gear teeth 170, the gear teeth 171 do not move over the gear teeth 160 of the auxiliary actuating member 16b and remain captured by the same mating teeth even when the gear teeth 170 have moved over the positioning teeth 151 of the bracket 15. In other words, the position of the intermediate element 17 relative to the auxiliary actuating member 16b remains the same as the position occupied before the operating member 16 has been manipulated.

The movement of the intermediate member 17 and the takeup member 18 in relation to the bracket 15 when the operating member 16 is rotated the pay-out direction D2 will now be described with reference to FIGS. 9A–9D. Rotating the operating member 16 in the reverse direction D2 causes the cam surfaces 171b of the gear teeth 171 of the intermediate member 17 to slide on the corresponding cam surfaces 160b of gear teeth 160 of auxiliary actuating member 16b, thus moving the intermediate member 17 along the first axis X away from auxiliary actuating member 16b and bracket 15. Because in this case the positioning surfaces 170a of the intermediate element 17 are captured by the corresponding positioning surfaces 151a of the bracket 15, the positioning surfaces 170a merely slide on the corresponding positioning surfaces 151a of the bracket 15, with the result that the intermediate member 17 does not rotate around the first axis at this time.

Further rotating the operating member 16 in the direction D2 causes the gear teeth 170 of the intermediate member 17 to move over the corresponding positioning teeth of the bracket 15 as shown in FIGS. 8C and 8D because the height 170h of the gear teeth 170 is less than the height 171h of the gear teeth 171. Thus, the intermediate member 17 and takeup member 18 move one speed step (W) in the pay-out direction. In the process, the gear teeth 171 of the intermediate element 17 first move away from the gear teeth 160 of the auxiliary actuating member 16b but then engage the same teeth again once the gear teeth 170 of the intermediate member 17 move over the positioning teeth 151 of the bracket 15.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure.

What is claimed is:

1. A bicycle shift control device comprising:
    a base member for attachment to the bicycle;
    an operating member rotatably supported relative to the base member for rotating in first and second directions;
    a transmission control member rotatably mounted relative to the base member for controlling the pulling and releasing of a transmission control element;
    a bracket for supporting a transmission control element diverting surface;
    wherein the transmission control member is disposed between the operating member and the bracket;
    an intermediate member coupled for rotation with the transmission control member, wherein the intermediate member rotates around a first axis, and wherein the intermediate member moves in the direction of the first axis between an engagement position in which the intermediate member engages the bracket and a disengagement position in which the intermediate member is disengaged from the bracket;
    wherein the operating member includes a drive surface for driving the intermediate member in a third direction when the operating member rotates in the first direction;
    wherein the intermediate member includes a first cam surface for causing movement of the intermediate member in the direction of the first axis toward the disengagement position during rotation of the intermediate member in the third direction; and
    wherein the intermediate member includes a positioning surface for preventing the intermediate member from rotating around the first axis when the intermediate member is in the engagement position.

2. The device according to claim 1 further comprising a pulley rotatably mounted to the bracket, wherein the transmission control element diverting surface is disposed on the pulley.

3. The device according to claim 1 wherein a surface of the bracket forms the transmission control element diverting surface.

4. The device according to claim 1 wherein the bracket is one piece with the base member.

5. The device according to claim 1 wherein the bracket has an outer portion disposed radially outwardly from a radially outermost surface of the operating member.

6. The device according to claim 1 wherein the bracket extends perpendicular to the base member.

7. The device according to claim 1 wherein the third direction is the same as the first direction.

8. The device according to claim 1 wherein the drive surface contacts the intermediate member when the operating member rotates in the first direction.

9. The device according to claim 1 wherein the first cam surface contacts the bracket when the intermediate member rotates in the third direction.

10. The device according to claim 1 wherein the positioning surface contacts the bracket when the intermediate member is in the engagement position.

11. The device according to claim 1 wherein the intermediate member includes a second cam surface for causing movement of the intermediate member in the direction of the first axis toward the disengagement position during rotation of the operating member in the second direction.

12. The device according to claim 11 wherein the second cam surface contacts the operating member when the operating member rotates in the second direction.

13. The device according to claim 11 wherein there is a plurality of the first cam surfaces, wherein there is a plurality of the second cam surfaces, and wherein the plurality of first cam surfaces and the plurality of second cam surfaces are disposed in a common plane.

14. The device according to claim 13 wherein the plane is oriented substantially perpendicular to the first axis.

15. The device according to claim 14 wherein the plurality of first cam surfaces are formed as a first circular arc, wherein the plurality of second cam surfaces are formed as a second circular arc, and wherein the first circular arc is radially displaced from the second circular arc relative to the first axis.

16. The device according to claim 1 wherein the drive surface and the positioning surface both extend in the direction of the first axis.

17. The device according to claim 1 wherein a height of the drive surface in the direction of the first axis is greater than a height of the positioning surface in the direction of the first axis.

18. The device according to claim 1 wherein the third direction is the same as the first direction, wherein the drive surface contacts the intermediate member when the operating member rotates in the first direction, wherein the first cam surface contacts the bracket when the intermediate member rotates in the third direction, and wherein the positioning surface contacts the bracket when the intermediate member is in the engagement position.

19. The device according to claim 18 wherein the intermediate member includes a second cam surface for causing movement of the intermediate member in the direction of the first axis toward the disengagement position during rotation of the operating member in the second direction, and wherein the second cam surface contacts the operating member when the operating member rotates in the second direction.

20. The device according to claim 19 wherein there is a plurality of the first cam surfaces, wherein there is a plurality of the second cam surfaces, and wherein the plurality of first cam surfaces and the plurality of second cam surfaces are disposed in a common plane.

21. The device according to claim 20 wherein the plane is oriented substantially perpendicular to the first axis.

22. The device according to claim 21 wherein there is a plurality of the drive surfaces, wherein there is a plurality of the positioning surfaces, and wherein the plurality of drive surfaces and the plurality of positioning surfaces are disposed in the plane when the intermediate member is in the engagement position.

23. The device according to claim 22 wherein the plurality of drive surfaces and the plurality of positioning surfaces both extend in the direction of the first axis.

24. The device according to claim 23 wherein a height of the plurality of drive surfaces in the direction of the first axis is greater than a height of the plurality of positioning surfaces in the direction of the first axis.

* * * * *